Figure 1:
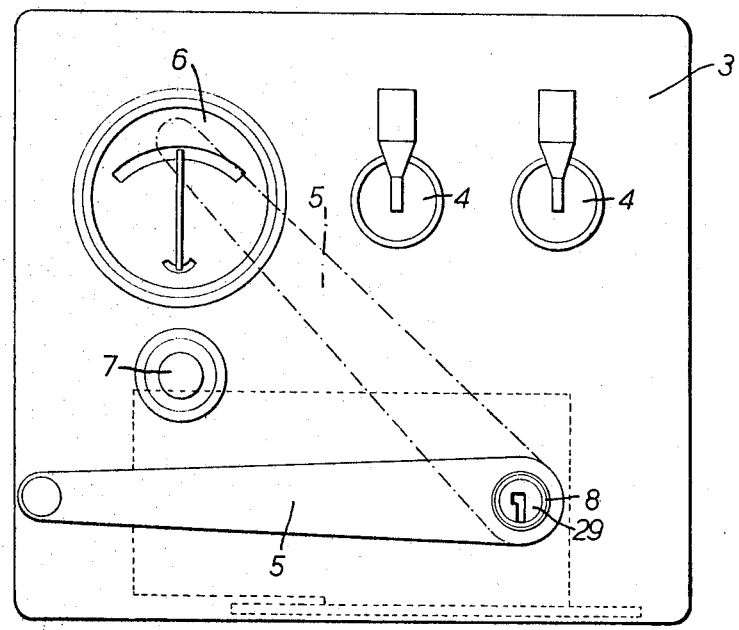

INVENTORS
ROBERT W. YOUNG
HENRY A. HALLETT
BY *Irwin S. Thompson*
ATTORNEY.

United States Patent Office 3,297,842
Patented Jan. 10, 1967

3,297,842
MOTOR CONTROL GEAR
Robert William Young and Henry Albert Hallett, Cheltenham, England, assignors to Sonomotive Engineers Limited, London, England, a British company
Filed July 14, 1964, Ser. No. 382,486
6 Claims. (Cl. 200—61.86)

This invention relates to control gear, and in particular to control gear for motorised equipment comprising a motor coupled to a driven load which has to be off-loaded before the motor is started or stopped. Such equipment is used in alternating pressure hydraulic power systems in which a driving motor is coupled to a hydraulic pulse generator which has to be off-loaded before starting or stopping the motor.

Control gear according to the invention comprises a control member, motor control means and off-loading means, the arrangement being such that movement of the control member to a "start" position first actuates the off-loading means and then actuates the motor control means, after which the member moves to a "run" position at which the off-loading means is inoperative, subsequent movement of the control member to a "stop" position again actuating the off-loading means and then the motor control means.

Preferably the same movement of the control member, which may be a control handle, from a normal rest position is used for both starting and stopping; the start and stop positions are then coincident. The control member may be arranged to return automatically to the rest position from the operative start or stop position in which it has to be held by an operator during starting and stopping.

When the control gear is to be used with equipment the motor of which is a prime mover the latter may be an internal combustion engine, and in this case the motor control means may control both the engine ignition and the engine starter motor. The arrangement is then such that movement of the control member to the start position closes the ignition circuit which remains closed when the control member moves to the run position, the ignition circuit being opened to stop the engine during movement to the stop position after actuation of the off-loading means. When using a control handle having a common start and stop position the ignition switch may be operated by means of a ratchet device so that the ignition circuit remains closed during return movement of the handle.

When the equipment to be controlled provides a hydraulic load for the motor, as in an alternating pressure hydraulic power system, the off-loading means may be an off-loading valve for the hydraulic circuit.

Figure 4:
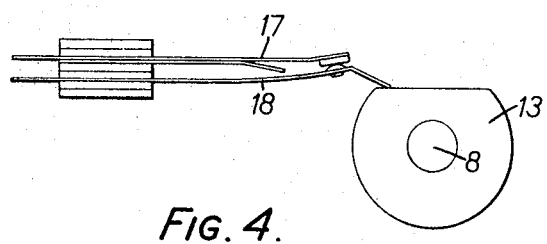
Figure 2:
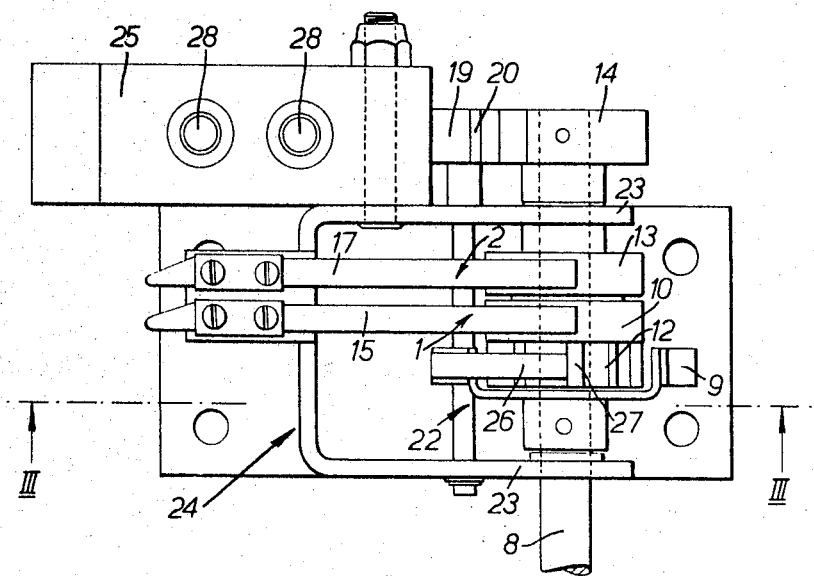
Figure 3:
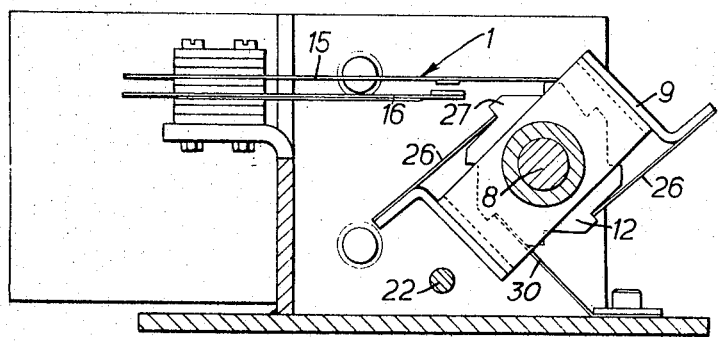

The invention will now be further described with reference to the accompanying drawings which illustrate, by way of example, control gear in accordance with the invention. In the drawings:

FIGURE 1 is a front view of a control panel,
FIGURE 2 is a detail plan view of an ignition/starter switch assembly mounted on the panel,
FIGURE 3 is a sectional detail view of the ignition switch on the line III—III in FIGURE 2, and
FIGURE 4 is a detail view of the starter switch of said assembly.

The illustrated control gear is designed for use with an alternating pressure hydraulic power system the generator of which is driven by an internal combustion engine employing spark ignition. The ignition switch 1 of FIGURES 2 and 3 is in use connected in the ignition circuit, so that the switch has to be closed before starting and is opened to stop the engine. After closing the switch 1 starting is achieved by means of the usual electric starter motor a solenoid switch of which is controlled by the starter switch 2 of FIGURES 2 and 4. The power system itself forms no part of the invention and hence is not shown in the drawings.

The control panel 3 is designed for mounting on the generator equipment, the latter being connected in known manner by flexible hoses to two receivers of the power system which may be in the form of load breakers. Two isolating switches 4 on the panel 3 in use control electrically-operated valves which respectively connect the generator to the flexible hoses.

It is necessary to off-load the generator before the engine can be started, and it is also essential to effect off-loading before the engine is stopped. As will be described the control gear is so constructed as to ensure that the correct starting and stopping sequence obtains during simple starting and stopping movements of a control handle 5 by an operator. The handle 5 is positioned at the front of the panel 3 and has a horizontal resting position from which it can be moved upwardly by the operator to a common start and stop position; when released the handle 5 returns to the resting position. The resting position is shown in full lines in FIGURE 1; the start and stop position is shown in broken lines in the same figure. The control panel 3 also incorporates an ammeter 6 and an oil pressure warning light 7 for the engine, these being associated with the engine in the usual manner.

The control handle 5 is mounted on the front of a control spindle 8 which passes through the panel 3. On the spindle 8 are in turn mounted an ignition pawl assembly 9 which is fixed on the spindle 8, an ignition cam 10 and ratchet wheel assembly 12 which cooperate with the pawl assembly 9 and are rotatably mounted on the spindle 8, an engine starter cam 13 fixed on the spindle 8, and an off-loading valve cam 14 also fixed on the spindle 8.

The ignition and starter cams 10 and 13 respectively control leaf contacts 15, 16 and 17, 18 of the switches 1 and 2. The valve cam 14 acts on the off-loading valve spindle 19 through a cam lever 20 which thus applies a straight thrust to the axially movable valve spindle 19. The cam lever 20 acts on the spindle 19 at its upper end and the lower end is attached to a horizontal spindle 22 which passes through and turns in front and rear walls 23 of a switch assembly mounting frame and bracket 24 in which the spindle 8 is also supported.

The complete starting and stopping sequence of operations will now be described. Initially the control handle 5 is in the lower resting position with the engine stopped, the ignition 1 and starter 2 switches being open and the off-loading valve 25 closed. Upward movement of the handle 5 to start the engine turns the three cams 10, 13 and 14, the ignition cam 10 being turned through the agency of the ratchet wheel 12. The cams are so profiled that the ignition switch 1 is closed and the off-loading valve 25 opened before the starter switch 2 closes to start the engine, the handle being held in the start position by the operator until the engine is running.

On release of the handle 5 it returns to the resting position, the pawl assembly 9 and ratchet wheel 12 freewheeling so that the ignition switch 1 remains closed. The return movement of the starter and valve cams 13 and 14 respectively de-energises the starter circuit and allows the off-loading valve 25 to close so that the equipment is fully operative and remains so until the handle 5 is again moved to stop the engine. The valve 25 has inlet and outlet connections 28 by which it is in use connected to the hydraulic load circuit in the appropriate manner.

A key-operated pin tumbler type lock 29 mounted in the front end of the spindle 8 enables the latter to be locked in the resting position. This prevents unauthorised operation of the control gear.

When it is desired to stop the engine the handle 5 is again raised to turn the three cams 10, 13 and 14 which are so profiled that the off-loading valve 25 is actuated before the ignition cam 10 moves to a position in which the ignition switch 1 opens. The ignition switch 1 controls not only the ignition circuit but also energisation of the starter circuit of the switch 2, so that although movement of the handle 5 to the stop position again closes the starter switch 2 it does not energise the starter motor solenoid as the ignition switch 1 has already opened. When the engine has stopped the handle 5 is released and again returns to the resting position, the pawl and ratchet assembly 9, 12 freewheeling to leave the ignition switch 1 open and the control gear reset ready for the next start.

The pawl assembly 9 employs two pawls 26 in the form of leaf springs which engage diametrically opposite pairs of the teeth such as 27 on the ignition switch ratchet wheel 12. The ratchet wheel 12 is also engaged by a leaf spring 30 fixed to the frame 24 (see FIGURE 3) and forming a check spring preventing return movement of the ratchet wheel 12 when the handle 5 and control spindle 8 return to the resting position.

We claim:

1. Control gear for an internal combustion engine permanently coupled to a hydraulic load, comprising an engine ignition switch, an engine starter switch, a hydraulic off-loading valve, a manually operable control member urged to a rest position and movable therefrom to a switch operating position representing coincident "start" and "stop" positions, switch actuating means which on consecutive movements of said control member to said operating position act respectively to close and open said ignition switch and on alternate movements corresponding to closing of said ignition switch operate said starter switch, and valve actuating means which on movement of said control member from said rest to said operating position act to open said off-loading valve prior to operation of said ignition switch and to close said off-loading valve during return movement of said control member to said resting position.

2. Control gear for an internal combustion engine permanently coupled to a hydraulic load, comprising an engine ignition switch, an engine starter switch, a hydraulic off-loading valve, a manually operable control handle urged to a rest position and movable therefrom to a switch operating position representing coincident "start" and "stop" positions, switch actuating means which on consecutive movements of said handle to said operating position act respectively to close and open said ignition switch and on alternate movements corresponding to closing of said ignition switch operate said starter switch, said switch operating means including a ratchet device which freewheels during return movement of the control member to the rest position so that the ignition circuit remains closed or open as the case may be, and valve actuating means which on movement of said control handle from said rest to said operating position act to open said off-loading valve prior to operation of said ignition switch and to close said off-loading valve during return movement of said control handle to said resting position.

3. Control gear for an internal combustion engine permanently coupled to a hydraulic load, comprising an engine ignition switch, an engine starter switch, a hydraulic off-loading valve, a manually operable control handle urged to a rest position and movable therefrom to a switch operating position representing coincident "start" and "stop" positions, a rotatably mounted spindle in which said handle is fixed, switch actuating means which include switch cams mounted on said spindle and which on consecutive movements of said control handle to said operating position act respectively to close and open said ignition switch and on alternate movements corresponding to closing of said ignition switch operate said starter switch, and a valve actuating cam which is also mounted on said spindle and which on movement of said control handle from said rest to said operating position acts to open said off-loading valve prior to operation of said ignition switch, the valve closing during return movement of said control handle to said resting position.

4. Control gear for an internal combustion engine permanently coupled to a hydraulic load, comprising an engine ignition switch, an engine starter switch, a hydraulic off-loading valve, a manually operable control member urged to a rest position and movable therefrom to coincident "start" and "stop" positions, switch actuating means which on consecutive movements of said control member to said operative position act respectively to close and open said ignition switch and on alternate movements corresponding to closing of said ignition switch operate said starter switch, and valve actuating means which on movement of said control member from said rest to said operative position act to open said off-loading valve prior to operation of said ignition switch and to close said off-loading valve during return movement of said control member to said resting position.

5. Control gear comprising a manually operable control member with a normal rest position, motor control start and stop means actuated by movement of said control member to coincident "start" and "stop" positions, motor off-loading means actuated by movement of said control member at an intermediate position between said rest and coincident positions, said off-loading means remaining operative while said control member is in said coincident positions and being inoperative when said control member is returned to said rest position which after starting corresponds to a "run" condition of said control means, and means which return the control member automatically to the rest position from the start and stop position in which the control member has to be held by an operator during starting and stopping.

6. Control gear comprising a manually operable control member in the form of a handle with a normal rest position, motor control start and stop means actuated by movement of said control handle to coincident "start" and "stop" positions, motor off-loading means actuated by movement of said control handle at an intermediate position between said rest and coincident positions, said off-loading means remaining operative while said control handle is in said coincident positions and being inoperative when said control handle is returned to said rest position which after starting corresponds to a "run" condition of said control means, and means which return the control handle automatically to the rest positions from the start and stop position in which the control handle has to be held by an operator during starting and stopping.

References Cited by the Examiner

UNITED STATES PATENTS

| | | | |
|---|---|---|---|
| 2,451,232 | 10/1948 | McCauley | 200—61.86 |
| 2,876,315 | 3/1959 | Morrell | 200—61.86 |
| 3,048,675 | 8/1962 | Olson et al. | 200—61.86 |
| 3,180,949 | 4/1965 | Rosenston | 200—61.86 |

BERNARD A. GILHEANY, *Primary Examiner.*

B. DOBECK, J. J. BAKER, *Assistant Examiners.*